Oct. 4, 1927.
M. F. CARR
1,643,981
FASTENER
Filed Nov. 18, 1924
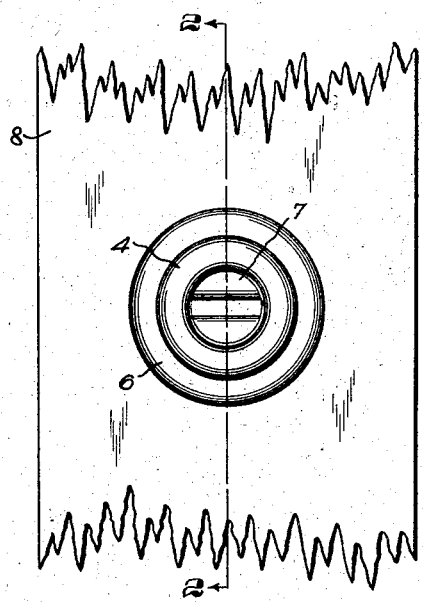
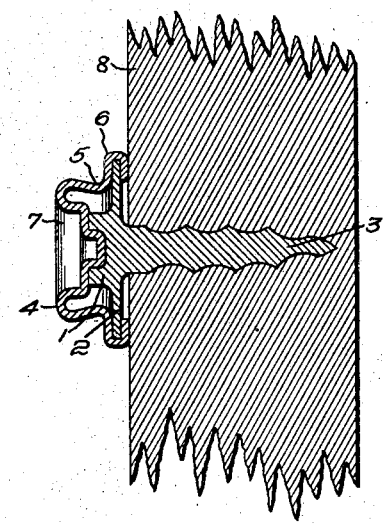
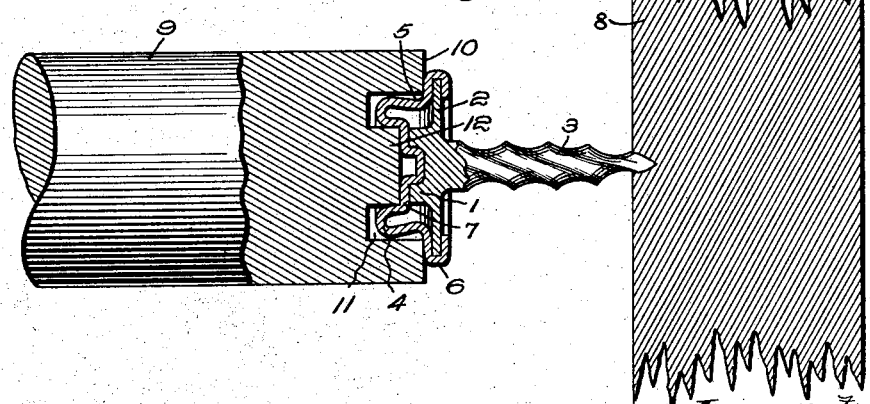
Inventor:
Moses F. Carr,
by Emery Booth Janney Varney
Att'ys Patented Oct. 4, 1927.

1,643,981

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

FASTENER.

Application filed November 18, 1924. Serial No. 750,588.

This invention aims to provide an improved fastener stud.

In the drawings, which show a preferred embodiment of my invention:—

Figure 1 is a front elevation of the stud secured to its support;

Fig. 2 is a section on the line 2—2 of Fig. 1; and

Fig. 3 is a sectional view, partly in elevation, showing the manner of attaching the stud to its support.

Referring to the drawings, I have shown a stud including a drive screw or attaching member having a slotted head 1, a flange 2 beneath the head 1 and a shank portion 3 having relatively steep pitched threads thereon. The drive screw is formed from a single piece of metal and the head 1 and flange 2 are formed by swedging the metal. The stud also includes a cap member which is formed from a single piece of metal pressed into shape to form a ringlike head 4, a neck 5 and a base flange 6.

The head 4 of the cap is provided with a central depressed portion 7, which is seated against the head of the screw and fits into the slot in the head 1 of the drive screw, as illustrated in Figs. 1 and 2.

The cap member may be secured to the drive screw by pressing the edges of the base flange 6 over the edge of the flange 2 of the drive screw and beneath the flange 2 so that the base flange 6 overlies a portion of the flange 2 at both sides thereof.

The stud illustrated is particularly well adapted to be secured to woodwork, floors and the like. I have therefore shown the stud being attached to a support 8 (Fig. 3) by driving the threaded shank portion 3 of the drive screw into the support 8. The driving operation must be accomplished without mutilating or crushing the cap member, and to this end I have provided (Fig. 3) a suitable tool 9 having an edge seat 10 seated against the base flange 6, a groove 11 to receive the head 4 of cap member and a boss portion 12 seated in the depressed portion 7 of the cap member. Thus, when the tool 9 is struck with a hammer, the entire force of the blow is transmitted to the drive screw, which back-supports the cap member whenever the tool 9 engages the cap member as shown in Fig. 3.

A screw driver may be inserted in that portion of the cap member which fits into the groove in the head 1 of the driver screw and rotated to detach the stud from the support 8. Rotation of the screw driver imparts a like motion to the drive screw because of the interlocking engagement of the cap with the slot in the head of the drive screw. Thus I have provided a stud which may be easily and quickly attached to its support, and may be conveniently detached therefrom when necessary.

While I have shown and described a preferred embodiment of my invention, it will be understood that changes may be made therein without departing from the scope of my invention, which is best defined in the appended claims.

I claim—

1. A snap fastener stud comprising, in combination, a cap part having a head, a neck and a base portion, said base portion being substantially larger in diameter than said head portion, a one-piece attaching element having a head back-supporting the central portion of said cap part, a relatively thin flange of substantially the same diameter as the base of the cap part over the edge of which a portion of said base is crimped to secure said parts together.

2. A snap fastener stud comprising, in combination, a cap part having a head, a neck and a base portion, said base portion being substantially larger in diameter than said head portion, a one-piece attaching element having a head, the peripheral wall of which is spaced from the inner wall of the neck of the cap part, said head of the attaching element back-supporting the central portion of said cap part, a relatively thin flange of substantially the same diameter as the base of the cap part over the periphery of which a portion of said base is crimped to secure said parts together, and interengaging means between the cap part and attaching element for preventing turning of one relative to the other.

3. A fastener stud comprising a one-piece drive screw and a one-piece cap member secured together and interlocked by means to prevent rotation of the cap member relative to the drive screw, said cap member having a head portion and a base portion back-supported by said drive screw to permit driving pressure to be exerted thereupon to drive said drive screw into a support said base being exposed outside of the outer periphery of the stud head provided by said cap member to permit engagement therewith of a driving tool when securing the fastener stud to its support.

4. A fastener stud comprising a one-piece drive screw and a one-piece cap member secured together and interlocked by means to prevent rotation of the cap member relative to the drive screw, said cap presenting a head having a depressed portion formed therein, a neck and a base flange, said base flange being of larger diameter than said head and said depressed portion and said base flange being back-supported by separate portions of said drive screw to provide means against which a suitable tool may be seated when driving said drive screw into a support, and tool-receiving means for receiving a tool for rotating said cap and drive screw as a unit to detach said fastener stud from its support.

In testimony whereof, I have signed my name to this specification.

MOSES F. CARR.